United States Patent [19]
Souissi et al.

[11] Patent Number: 6,141,543
[45] Date of Patent: Oct. 31, 2000

[54] METHOD AND APPARATUS FOR SIMULCAST SPACE DIVERSITY TRANSMISSION OF A MESSAGE IN A RADIO MESSAGING SYSTEM

[75] Inventors: Slim Souissi, Fort Worth; Thomas Casey Hill, Trophy Club, both of Tex.

[73] Assignee: Motorola, Inc., Schaumburg, Ill.

[21] Appl. No.: 09/059,648

[22] Filed: Apr. 13, 1998

[51] Int. Cl.[7] .............................. H04B 7/02; H04B 1/66
[52] U.S. Cl. ............................................ 455/101; 455/503
[58] Field of Search ................................ 455/101, 11.1, 455/503, 7, 103; 375/299; 370/315

[56] References Cited

U.S. PATENT DOCUMENTS

| | | | |
|---|---|---|---|
| 4,718,109 | 1/1988 | Breeden et al. | 455/503 |
| 5,038,403 | 8/1991 | Leitch | 455/503 |
| 5,423,063 | 6/1995 | Goldberg | 455/503 |
| 5,657,357 | 8/1997 | Jones et al. . | |
| 5,724,662 | 3/1998 | Goldberg et al. | 455/503 |
| 5,742,911 | 4/1998 | Dumbrill et al. | 455/562 |
| 5,850,605 | 12/1998 | Souissi et al. | 455/437 |
| 5,859,879 | 1/1999 | Bolgiano et al. | 370/330 |
| 5,878,352 | 3/1999 | Souissi et al. | 455/503 |
| 5,963,868 | 10/1999 | Baek | 455/503 |
| 5,983,112 | 11/1999 | Kay | 455/504 |
| 6,006,075 | 12/1999 | Smith et al. | 455/101 |
| 6,011,977 | 1/2000 | Brown et al. | 455/503 |

*Primary Examiner*—William G. Trost
*Assistant Examiner*—Erika A. Gary
*Attorney, Agent, or Firm*—R. Louis Breeden

[57] ABSTRACT

At least two subsets (204, 208) of simulcast transmitters are defined (802) that produce differing simulcast distortion characteristics at a receiver (210), and a message is sent (806) in a simulcast transmission from one of the at least two subsets. The message is then repeated (808, 810, 806) in a simulcast transmission from another of the at least two subsets, until all of the at least two subsets have transmitted the message.

18 Claims, 4 Drawing Sheets

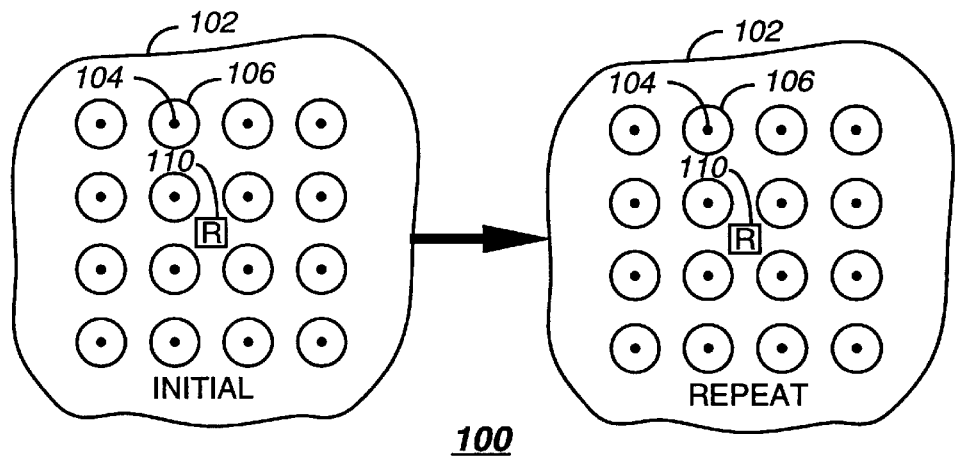
FIG. 1 PRIOR ART
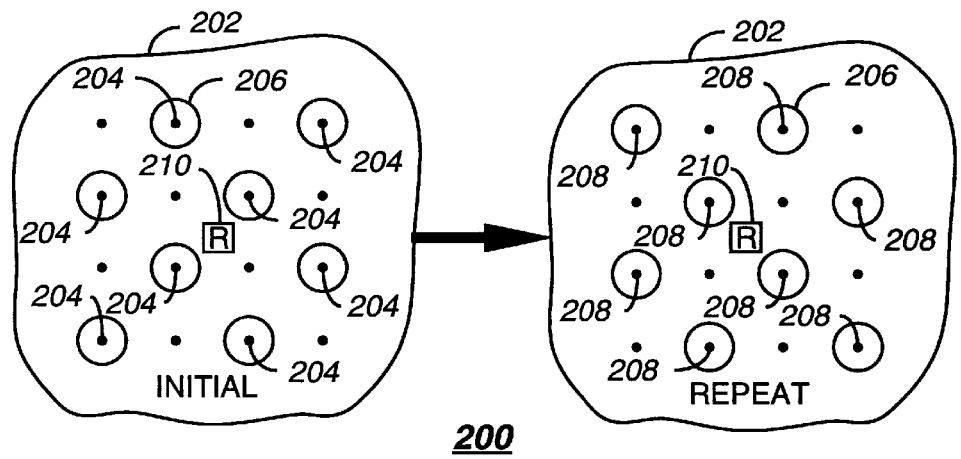
FIG. 2
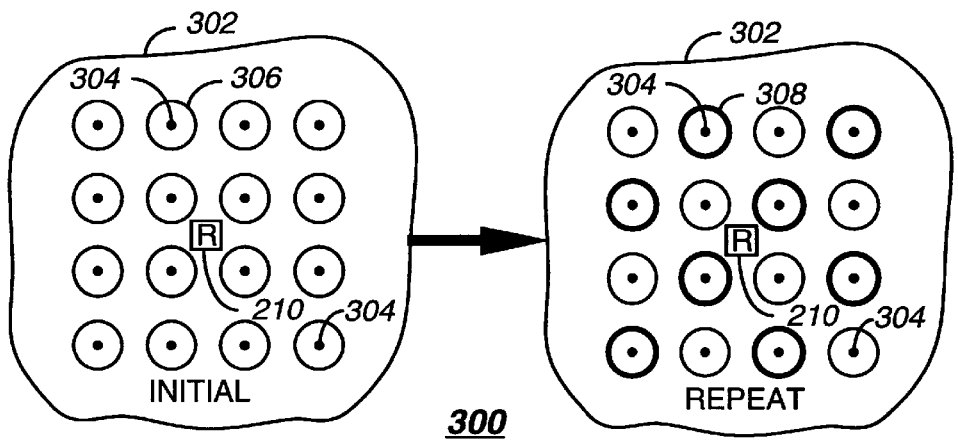
FIG. 3

METHOD AND APPARATUS FOR SIMULCAST SPACE DIVERSITY TRANSMISSION OF A MESSAGE IN A RADIO MESSAGING SYSTEM

FIELD OF THE INVENTION

This invention relates in general to radio communication systems, and more specifically to a method and apparatus for simulcast space diversity transmission of a message in a radio messaging system.

BACKGROUND OF THE INVENTION

The increasing popularity of radio messaging has led to a need for increased transmission speed to handle the growing traffic. Increased transmission speed, however, presents new challenges to simulcast system design. As transmission speed increases, simulcast performance can be severely affected by "zero beating" (i.e., cancellation of two out-of-phase carriers of similar amplitude) and delay spread distortion.

Meticulous system design currently is required to optimize system performance for high speed simulcast transmission. Antenna heights and patterns, and transmission launch delays are some of the key ingredients for system optimization. A problem with such optimization is that it can lead to a complex and rigid system that is difficult to change, for example, to expand the system.

Thus, what is needed is a method and apparatus that can accommodate high speed simulcast transmission without the need for extreme system optimization. A method and apparatus that can minimize the effect of zero beating and delay spread on simulcast performance is required.

SUMMARY OF THE INVENTION

An aspect of the present invention is a method of simulcast space diversity transmission of a message to a receiver in a radio messaging system. The method comprises the steps of defining at least two subsets of simulcast transmitters that produce differing simulcast distortion characteristics at the receiver, and sending the message in a simulcast transmission from one of the at least two subsets. The method further comprises the step of then repeating the message in a simulcast transmission from another of the at least two subsets, until all of the at least two subsets have transmitted the message.

Another aspect of the present invention is a controller for controlling a simulcast space diversity transmission of a message to a receiver in a radio messaging system. The controller comprises an input interface for receiving the message, and a processing system coupled to the input interface for processing the message. The controller further comprises an output interface coupled to the processing system for controlling a plurality of transmitters to transmit the message. The processing system is programmed to define at least two subsets of simulcast transmitters that produce differing simulcast distortion characteristics at the receiver, and to send the message in a simulcast transmission from one of the at least two subsets. The processing system is further programmed to then repeat the message in a simulcast transmission from another of the at least two subsets, until all of the at least two subsets have transmitted the message.

BRIEF DESCRIPTION OF THE DRAWINGS

FIG. 1 is a simulcast coverage diagram depicting a prior art time diversity technique.

FIG. 2 is a simulcast coverage diagram depicting a first exemplary simulcast space diversity technique in accordance with the present invention.

FIG. 3 is a simulcast coverage diagram depicting a second exemplary simulcast space diversity technique in accordance with the present invention.

DETAILED DESCRIPTION OF THE DRAWINGS

Figure 4:
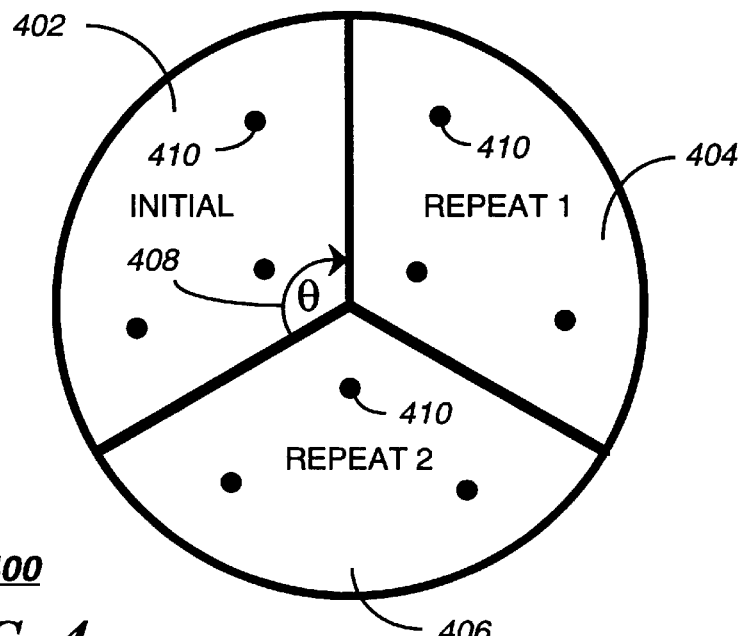
FIG. 4 is a simulcast coverage diagram depicting a third exemplary simulcast space diversity technique in accordance with the present invention.

Referring to FIG. 1, a simulcast coverage diagram 100 depicts a prior art time diversity technique. The diagram 100 depicts a coverage area 102 covered by transmitters 104 during an initial transmission interval (left half of FIG. 1) for sending a message to a receiver 110 and a later repeat transmission interval (right half of FIG. 1) for resending the message to the receiver 110. A circle 106 around a transmitter 104 indicates that the transmitter 104 is actively transmitting during the transmission interval. Note that in accordance with the prior art time diversity technique, all the transmitters 104 transmit the message during both the initial transmission interval and the repeat transmission interval. When operating at a relatively high bit rate, e.g., 6400 bits per second (bps), the prior art time diversity technique is subject to significant simulcast distortion problems.

FIG. 2 is a simulcast coverage diagram 200 depicting a first exemplary simulcast space diversity technique in accordance with the present invention. The diagram 200 depicts a coverage area 202 covered by transmitters during an initial transmission interval and a later repeat transmission interval. A circle 206 around a transmitter indicates that the transmitter is actively transmitting during the corresponding transmission interval. Note that in the first exemplary simulcast space diversity technique in accordance with the present invention, two subsets 204, 208 of simulcast transmitters have been defined. In this example, the two subsets 204, 208 have been selected from separate sets of transmitters. It will be appreciated that, alternatively, the transmitters can overlap between subsets.

Preferably, only the transmitters of the subset 204 send the message in a first simulcast transmission during the initial transmission interval, as depicted by the circles 206 in the left half of the diagram 200. Only the transmitters of the subset 208 send the message in a second simulcast transmission during the repeat transmission interval, as depicted by the circles 206 in the right half of the diagram 200. Because the transmitters of the two subsets 204, 208 are positioned at different locations in the coverage area 202, they produce differing simulcast distortion characteristics at the receiver 210 during the initial and repeat transmission intervals, thereby advantageously improving the simulcast performance. It will be appreciated that the composition of the subsets 204, 208 can be dynamically adjusted according to the transmission technique used for transmitting the message. For example, in response to an increase in transmission speed to 9600 bps, fewer transmitters with a different separation can be used in each subset, and a different number of subsets, e.g., 3 subsets, can be defined, so that all the transmitters will have an opportunity to transmit in one of the subsets. It will be further appreciated that it is beneficial to adjust selected transmission parameters, such as the launch delays applied to the transmitters of the two subsets 204, 208, such that coverage is optimized for each subset 204, 208. In the event that transmitters overlap between the subsets 204, 208, the launch delays of the overlapping transmitters can be adjusted between the initial and repeat transmission intervals to optimize the simulcast performance of each subset 204, 208.

FIG. 3 is a simulcast coverage diagram 300 depicting a second exemplary simulcast space diversity technique in accordance with the present invention. The diagram 300 depicts a coverage area 302 covered by transmitters 304 during an initial transmission interval and a later repeat transmission interval. A non-bold circle 306 around a transmitter 304 indicates that the transmitter 304 is actively transmitting with a first launch delay during the corresponding transmission interval. A bold circle 308 around a transmitter 304 indicates that the transmitter 304 is actively transmitting with a second launch delay different from the first launch delay during the corresponding transmission interval. In the diagram 300, one-half of the transmitters 304 change to a different launch delay during the repeat transmission interval. The first and second launch delays preferably differ from one another by an amount sufficient to produce a significant difference in the simulcast distortion characteristics of the system, e.g., by 15% of a symbol period. It will be appreciated that, alternatively, transmitters and launch delays can be arranged and apportioned differently from what is depicted in the diagram 300, as long as differing simulcast distortion characteristics are produced between the initial and repeat transmission intervals. It will be further appreciated that, alternatively, a transmission parameter other than launch delay can be varied between the initial and repeat transmission intervals. For example, power levels and/or offset frequencies of a portion of the transmitters 304 can be varied to produce the differing simulcast distortion characteristics between the initial and repeat transmission intervals. In addition, if the transmitters 304 include space diversity antennas, a portion of the transmitters 304 can transmit, during the repeat transmission interval, from an antenna different from that utilized during the initial transmission interval, thereby producing the preferred differing simulcast distortion characteristics between the initial and repeat transmission intervals.

FIG. 4 is a simulcast coverage diagram 400 depicting a third exemplary simulcast space diversity technique in accordance with the present invention. In the diagram 400, first, second, and third subsets 402, 404, 406 of transmitters 410 are defined such that the subsets 402, 404, 406 cover sectors positioned at a predetermined angle 408 with respect to one another, e.g., 120 degrees. The transmitters 410 of the subsets 402, 404, 406 then perform simulcast transmissions sequentially in each of the subsets 402, 404, 406, beginning with an initial transmission in the first subset 402, continuing with a first repeat transmission in the second subset 404, and ending with a second repeat transmission in the third subset 406. It will be appreciated that, alternatively, a different number of sectors and a different transmission order can be utilized. This sectorization technique is done to optimize the simulcast performance of each of the subsets 402, 404, 406, such that when all the subsets 402, 404, 406 have transmitted, the message reception reliability is better than if all the transmitters 410 had transmitted simultaneously.

Figure 5:
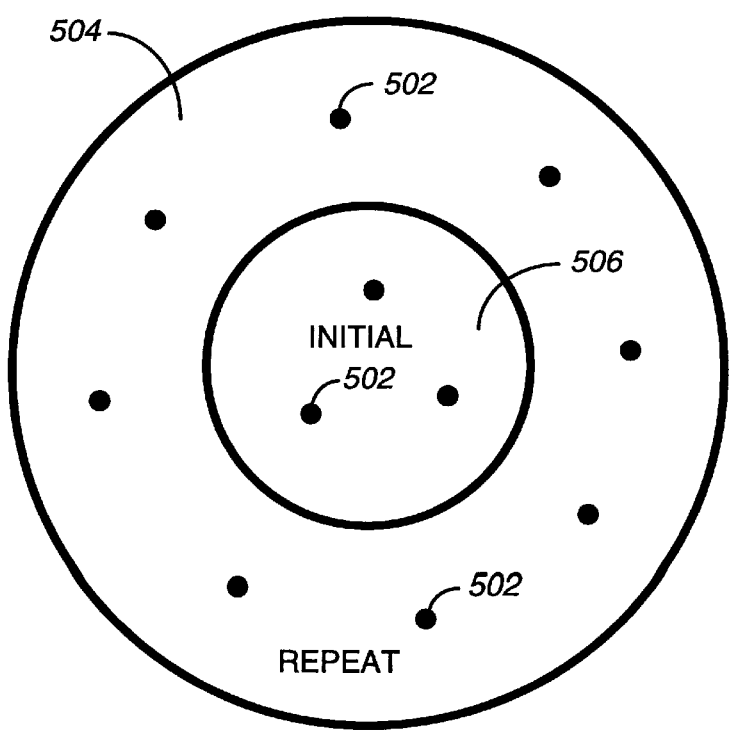
FIG. 5 is a simulcast coverage diagram depicting a fourth exemplary simulcast space diversity technique in accordance with the present invention.

FIG. 5 is a simulcast coverage diagram 500 depicting a fourth exemplary simulcast space diversity technique in accordance with the present invention. In the diagram 500, first and second subsets 504, 506 of transmitters 502 have been defined such that the first subset 504 encircles the second subset 506. The transmitters 502 of each of the subsets then perform simulcast transmissions sequentially. For example, the transmitters 502 of the second subset 506 transmit an initial simulcast transmission, followed by the transmitters 502 of the first subset 504 with a repeat simulcast transmission. It will be appreciated that, alternatively, a different number of substantially concentric subsets of transmitters can be defined, more than two sequential transmissions can be performed, and/or multiple subsets can transmit simultaneously. For example, four concentric subsets A-B-C-D-E-F can be defined, and simulcast transmissions can be performed in subsets A and D, then in B and E, and finally in C and F. The fourth exemplary simulcast space diversity technique is preferred, for example, when the innermost subset of transmitters have high antennas that can interfere with the transmitters of the outer subsets.

Figure 6:
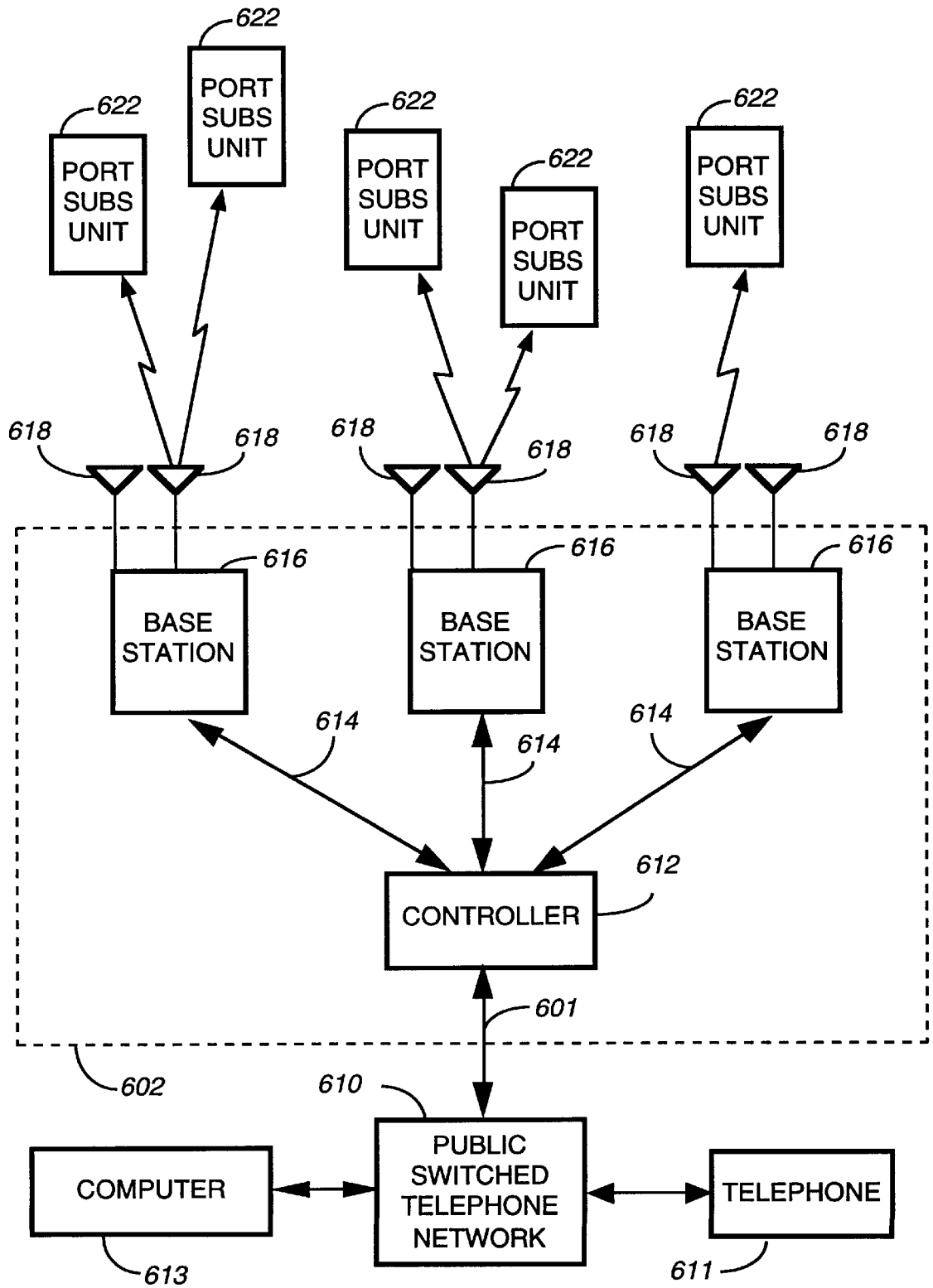
FIG. 6 is an electrical block diagram of an exemplary radio messaging system in accordance with the present invention.

Referring to FIG. 6, an electrical block diagram of an exemplary radio messaging system in accordance with the present invention comprises a fixed portion 602 including a controller 612 and a plurality of base stations 616. The radio messaging system also includes a portable portion including a plurality of portable subscriber units 622. The base stations 616 preferably communicate with the portable subscriber units 622 utilizing conventional radio frequency (RF) techniques, and are coupled by communication links 614 to the controller 612, which controls the base stations 616 through well-known techniques.

The hardware of the controller 612 is preferably a combination of the Wireless Messaging Gateway (WMG™) Administrator! paging terminal, and the RF-Conductor!™ message distributor manufactured by Motorola, Inc., and includes software modified in accordance with the present invention. The hardware of the base stations 616 is preferably similar to the RF-Orchestra! transmitter manufactured by Motorola, Inc. The portable subscriber units 622 are preferably conventional selective call receivers able to utilize repeat message transmissions as a tool for error correction through well-known techniques. It will be appreciated that other similar hardware can be utilized as well for the controller 612, the base stations 616, and the portable subscriber units 622.

Each of the base stations 616 includes a transmitter for transmitting RF signals to the portable subscriber units 622 via an antenna 618. In one embodiment, the antenna 618 comprises at least two conventional space diversity antennas. The RF signals transmitted by the base stations 616 to the portable subscriber units 622 comprise selective call addresses identifying the portable subscriber units 622, and voice and data messages originated by a caller, as well as commands originated by the controller 612 for adjusting operating parameters of the radio communication system.

The controller 612 preferably is coupled by telephone links 601 to a public switched telephone network (PSTN) 610 for receiving selective call message originations therefrom. Selective call originations comprising voice and data messages from the PSTN 610 can be generated, for example, from a conventional telephone 611 or a conventional computer 613 coupled to the PSTN 610. It will be appreciated that, alternatively, other types of communication networks, e.g., packet switched networks, the Internet, and local area networks, can be utilized as well for transporting originated messages to the controller 612.

The over-the-air protocol utilized for message transmission is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will be further appreciated that the present invention can be applied to a two-way radio messaging system as well.

Figure 7:
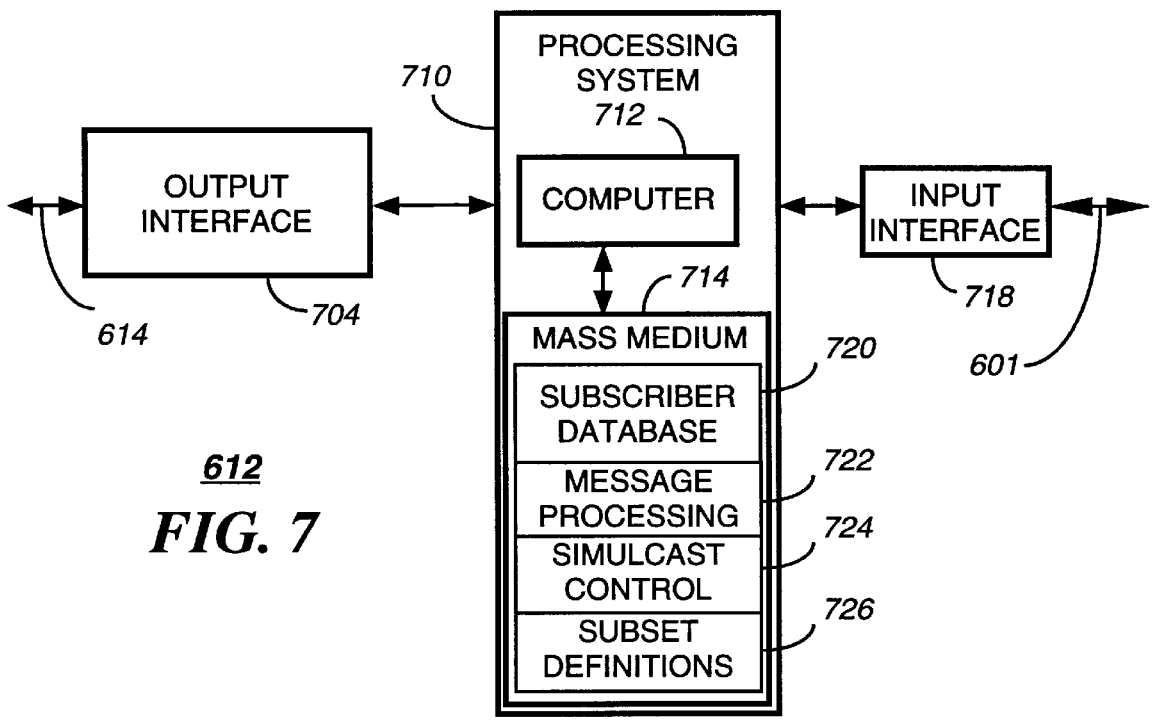
FIG. 7 is an electrical block diagram of an exemplary controller in accordance with the present invention.

FIG. 7 is an electrical block diagram of an exemplary controller 612 in accordance with the present invention. The controller 612 comprises an input interface for receiving a message through the telephone links 601. The controller further comprises a processing system 710 coupled to the input interface for processing the message. The controller also includes an output interface coupled to the communication links 614 for controlling the transmitters of the base stations 616 to transmit the message. The processing system 710 comprises a conventional computer system 712 and a conventional mass medium 714 programmed with a subscriber database 720 for defining subscriber service attributes, and software elements for controlling the processing system 710. The software elements include a message processing element 720 for processing the message through well-known techniques. The software elements also include a simulcast control element 724 for controlling the transmitters of the base stations 616 to perform a simulcast space diversity transmission of the message, in accordance with the present invention. In addition, the mass medium 714 includes space for storing a plurality of subset definitions 726 defining subsets of simulcast transmitters and parameters associated therewith that produce differing simulcast distortion characteristics in the radio messaging system.

Figure 8:
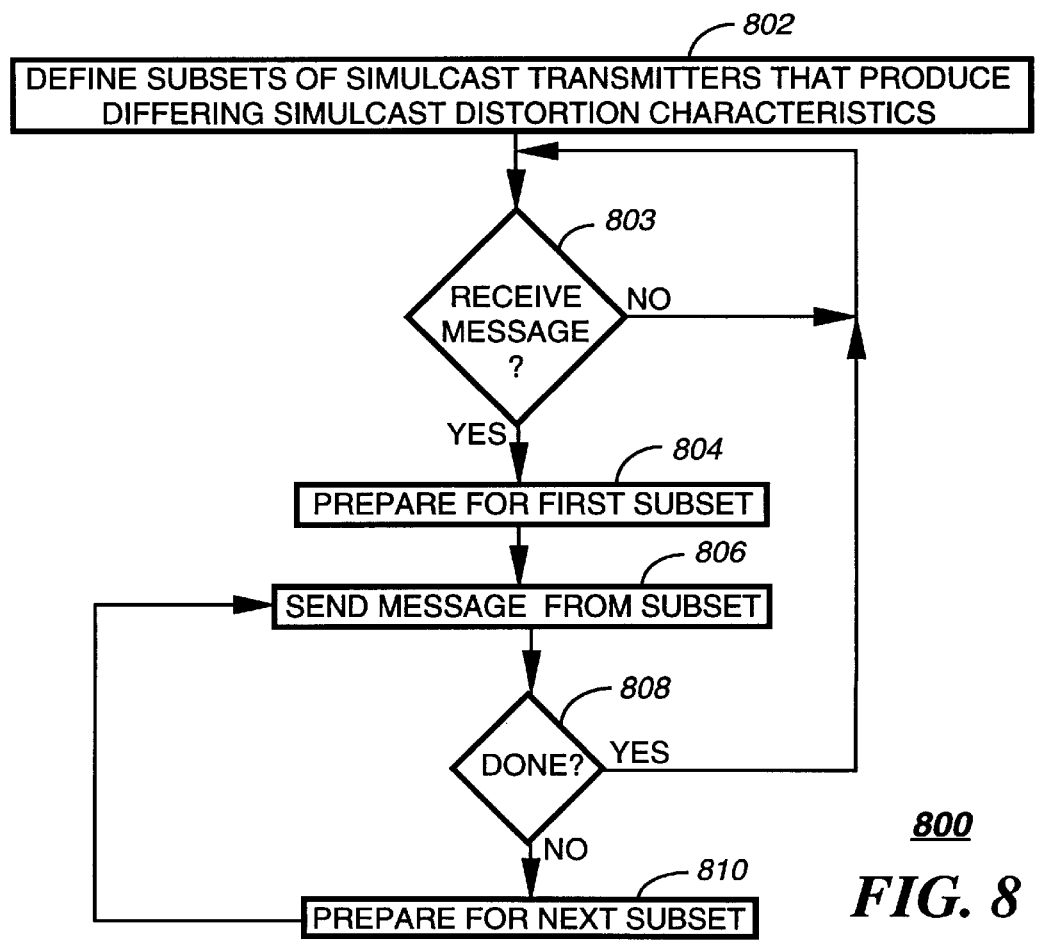
FIG. 8 is a flow diagram depicting operation of the radio messaging system in accordance with the present invention.

FIG. 8 is a flow diagram 800 depicting operation of the radio messaging system in accordance with the present invention. First, the subset definitions 726 are defined 802 for the system and stored in the mass medium 714. Then the processing system 710 waits 803 for a message needing transmission. When the message is received, the processing system 710 prepares 804 for transmitting the message as a simulcast message from the first subset of transmitters, by accessing the subset definitions 726 defined and stored in the mass medium 714. The processing system 710 then controls the first subset of transmitters to send 806 the message in accordance with the defined subset parameters, such as launch delays, frequency offsets, and power levels. The processing system 710 then checks 808 whether the message has been sent in all subsets. If so, the processing system 710 returns to step 803 to wait for another message. If not, the processing system 710 prepares 810 for the next subset defined in the subset definitions 726 by adjusting the transmitters in accordance with the defined parameters of the next subset. The flow then returns to step 806 to send the message in the next subset.

Thus, it should be clear from the preceding disclosure that the present invention provides a method and apparatus that advantageously accommodates high speed simulcast transmission without the need for extreme system optimization. The method and apparatus minimizes the effect of zero beating and delay spread on simulcast performance. Many modifications and variations of the present invention are possible in light of the above teachings. Thus, it is to be understood that, within the scope of the appended claims, the invention can be practiced other than as described herein above.

What is claimed is:

1. A method of simulcast space diversity transmission of a selective call message to a portable subscriber unit in a radio messaging system, comprising the steps of:

defining at least two subsets of simulcast transmitters that produce differing simulcast distortion characteristics at the portable subscriber unit;

sending the selective call message to the portable subscriber unit in a simulcast transmission from one of the at least two subsets; and then repeating the selective call message in a simulcast transmission from another of the at least two subsets, until all of the at least two subsets have transmitted the selective call message.

2. The method of claim 1, wherein the defining step comprises the step of selecting the at least two subsets from separate sets of transmitters.

3. The method of claim 1, wherein the defining step comprises the step of dynamically adjusting a composition of the at least two subsets of simulcast transmitters in accordance with a transmission technique used for transmitting the selective call message.

4. The method of claim 1, wherein the defining step comprises the step of applying a launch delay to a portion of the simulcast transmitters in one of the at least two subsets, that is different from the launch delay applied to the portion of the simulcast transmitters in another of the at least two subsets.

5. The method of claim 1, wherein the defining step comprises the step of applying a power level in a portion of the simulcast transmitters in one of the at least two subsets, that is different from the power level applied in the portion of the simulcast transmitters in another of the at least two subsets.

6. The method of claim 1, wherein the defining step comprises the step of applying an offset frequency in a portion of the simulcast transmitters in one of the at least two subsets, that is different from the offset frequency applied in the portion of the simulcast transmitters in another of the at least two subsets.

7. The method of claim 1, wherein the defining step comprises the step of defining the at least two subsets such that the at least two subsets cover sectors positioned at a predetermined angle with respect to one another.

8. The method of claim 1, wherein the defining step comprises the step of defining one of the at least two subsets to encircle another of the at least two subsets.

9. The method of claim 1, wherein the simulcast transmitters include space diversity antennas, and wherein the defining step comprises the step of controlling a portion of the simulcast transmitters of one of the at least two subsets to transmit from an antenna different from the antenna utilized for transmission in the portion of the simulcast transmitters of another of the at least two subsets.

10. A controller for controlling a simulcast space diversity transmission of a selective call message to a portable subscriber unit in a radio messaging system, comprising:

an input interface for receiving the selective call message;

a processing system coupled to the input interface for processing the selective call message;

an output interface coupled to the processing system for controlling a plurality of transmitters to transmit the selective call message, wherein the processing system is programmed to:

define at least two subsets of simulcast transmitters that produce differing simulcast distortion characteristics at the portable subscriber unit;

send the selective call message to the portable subscriber unit in a simulcast transmission from one of the at least two subsets; and then repeat the selective call message in a simulcast transmission from another of the at least two subsets, until all of the at least two subsets have transmitted the selective call message.

11. The controller of claim 10, wherein the processing system is further programmed to select the at least two subsets from separate sets of transmitters.

12. The controller of claim 10, wherein the processing system is further programmed to dynamically adjust a composition of the at least two subsets of simulcast transmitters in accordance with a transmission technique used for transmitting the selective call message.

13. The controller of claim 10, wherein the processing system is further programmed to apply a launch delay to a portion of the simulcast transmitters in one of the at least two subsets, that is different from the launch delay applied to the portion of the simulcast transmitters in another of the at least two subsets.

14. The controller of claim 10, wherein the processing system is further programmed to apply a power level in a portion of the simulcast transmitters in one of the at least two subsets, that is different from the power level applied in the portion of the simulcast transmitters in another of the at least two subsets.

15. The controller of claim 10, wherein the processing system is further programmed to apply an offset frequency in a portion of the simulcast transmitters in one of the at least two subsets, that is different from the offset frequency applied in the portion of the simulcast transmitters in another of the at least two subsets.

16. The controller of claim 10, wherein the processing system is further programmed to define the at least two subsets to cover sectors positioned at a predetermined angle with respect to one another.

17. The controller of claim 10, wherein the processing system is further programmed to define one of the at least two subsets to encircle another of the at least two subsets.

18. The controller of claim 10, wherein the simulcast transmitters include space diversity antennas, and wherein the processing system is further programmed to control a portion of the simulcast transmitters of one of the at least two subsets to transmit from an antenna different from the antenna utilized for transmission in the portion of the simulcast transmitters of another of the at least two subsets.

* * * * *